United States Patent [19]
Mahaffey

[11] Patent Number: 5,949,851
[45] Date of Patent: Sep. 7, 1999

[54] HOME WEATHER EMERGENCY WARNING SYSTEM

[76] Inventor: Shannon R. Mahaffey, 5101 Estes Pkwy #124, Longview, Tex. 75603

[21] Appl. No.: 09/086,442

[22] Filed: May 28, 1998

[51] Int. Cl.$^6$ .................................................. H04M 11/04
[52] U.S. Cl. ..................... 379/48; 379/110.01; 340/601
[58] Field of Search ........................ 379/37–51, 110.01; 340/601, 602; 455/66, 556, 555

[56] References Cited

U.S. PATENT DOCUMENTS 5,541,980  7/1996  Urewicz ................................. 379/48

*Primary Examiner*—Wing F. Chan

[57] ABSTRACT

A severe weather warning system is provided including an indicator mechanism adapted for providing an indication of a weather disturbance upon the receipt thereof. A modem has an outlet port connected to a conventional phone and an inlet port connected to a telecommunication network. During use, the modem has a first mode of operation for allowing the transfer of audio signals between the inlet port and the outlet port and a second mode of operation for when a weather disturbance is detected. Next provided is control circuitry adapted for transmitting to the indicator means the indication of a weather disturbance. Finally, a central control base includes a source of weather data for supplying a geographical location of a weather disturbance and a description of the weather disturbance, a subscriber database having stored therein a plurality of phone numbers of users and further the geographical location thereof, a modem adapted for calling a phone number, and a computer adapted to effect the transmission of the indication of a weather disturbance by the indicator means upon the detection of a weather disturbance by the source of weather data. Such phone number corresponds to a user residing within a geographical location wherein a weather disturbance is present as indicated by the source of weather data.

5 Claims, 3 Drawing Sheets

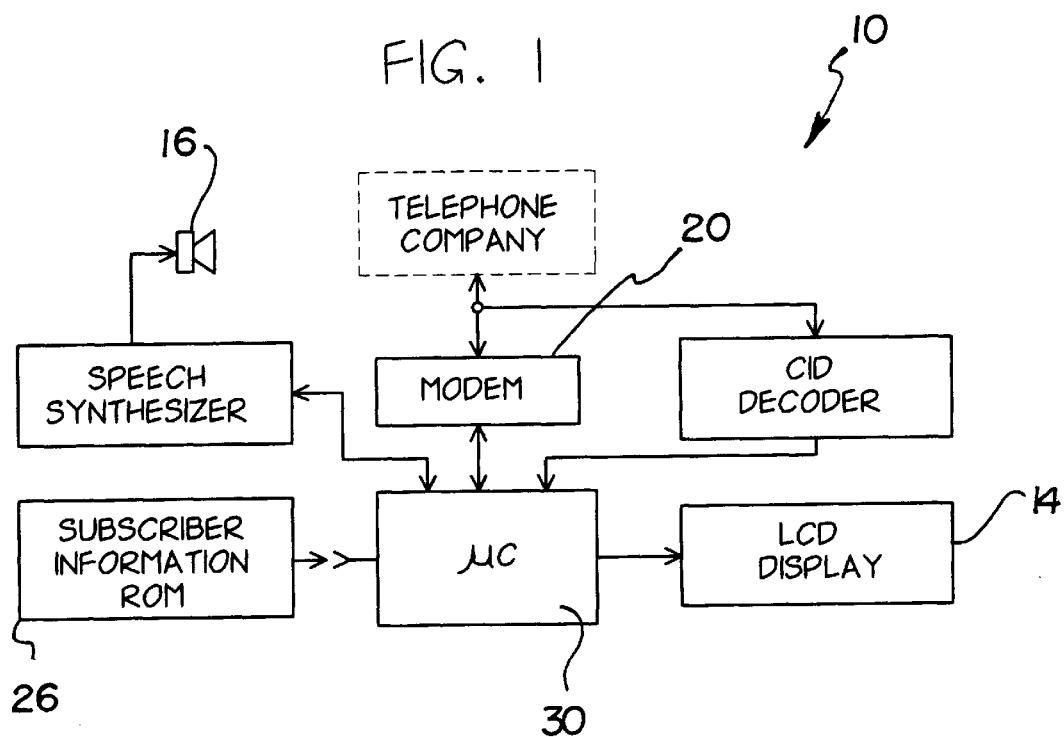
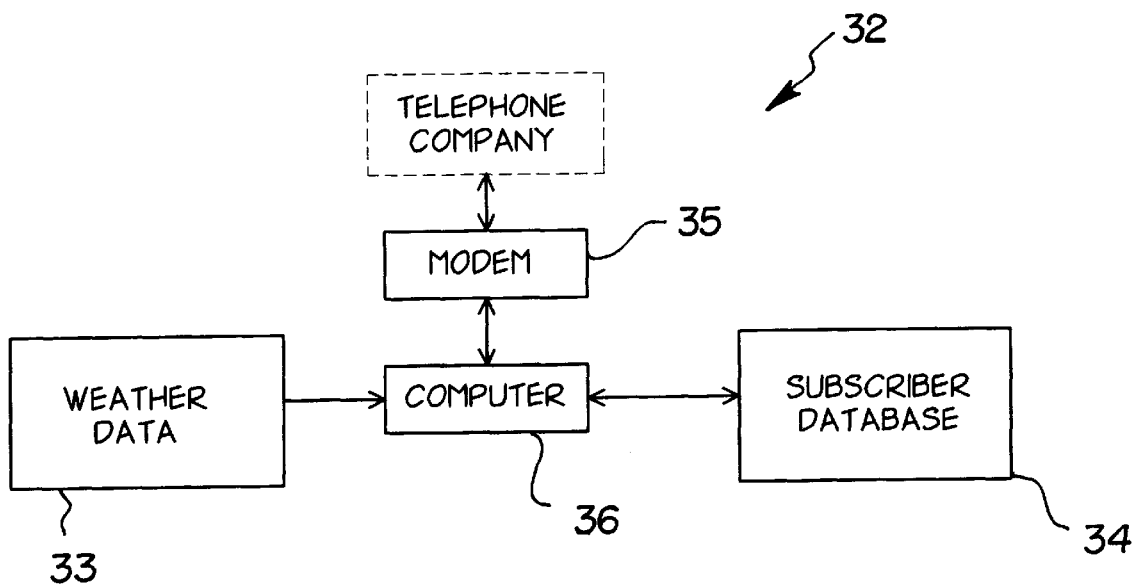

HOME WEATHER EMERGENCY WARNING SYSTEM

BACKGROUND OF THE INVENTION

1. Field of the Invention

The present invention relates to weather service devices and more particularly pertains to a new home weather emergency warning system for sending a warning of incoming weather disturbances over a telecommunication network.

2. Description of the Prior Art

The use of weather service devices is known in the prior art. More specifically, weather service devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art weather service devices include U.S. Pat. No. 5,444,433; U.S. Pat. No. 4,031,467; U.S. Pat. No. 5,121,430; U.S. Pat. No. 4,446,454; U.S. Pat. No. 4,155,042; and U.S. Pat. No. Des. 353,116.

In these respects, the home weather emergency warning system according to the present invention substantially departs from the conventional concepts and designs of the prior art, and in so doing provides an apparatus primarily developed for the purpose of sending a warning of incoming weather disturbances over a telecommunication network.

SUMMARY OF THE INVENTION

In view of the foregoing disadvantages inherent in the known types of weather service devices now present in the prior art, the present invention provides a new home weather emergency warning system construction wherein the same can be utilized for sending a warning of incoming weather disturbances over a telecommunication network.

The general purpose of the present invention, which will be described subsequently in greater detail, is to provide a new home weather emergency warning system apparatus and method which has many of the advantages of the weather service devices mentioned heretofore and many novel features that result in a new home weather emergency warning system which is not anticipated, rendered obvious, suggested, or even implied by any of the prior art weather service devices, either alone or in any combination thereof.

To attain this, the present invention generally comprises a housing. Situated on the housing is a display, as shown in FIG. 4. The display is adapted for depicting alphanumeric data representative of a visual warning message upon the receipt thereof. Associated therewith is a speaker situated on the housing for sounding audio signals representative of an audio warning message upon the receipt thereof. A modem is situated within the housing and has an outlet port connected to a conventional phone and an inlet port connected to a telecommunication network. During operation, the modem has a first mode of operation for allowing the transfer of audio signals between the inlet port and the outlet port. Upon the receipt of an activation signal, the modem further has a second mode of operation for receiving data from the inlet port. Next provided is read only memory situated within the housing. The read only memory serves for storing alphanumeric data representative of visual warning messages and audio signals representative of audio warning messages. Each warning message has a binary code associated therewith. It should be understood that each warning message corresponds to a specific set of instructions and a type of weather disturbance. The final component situated within the housing is control circuitry. Such circuitry is connected to the display, speaker, modem, and read only memory. In use, the control circuitry is adapted for transmitting audio signals and alphanumeric data to the speaker and display, respectively. Such a signals and data correspond to binary codes received by the modem. Finally, a central control base is provided including a source of weather data for supplying a geographical location of a weather disturbance and a description of the weather disturbance. Further associated therewith is a subscriber database having stored therein a plurality of phone numbers of users and further the geographical location thereof. A modem is adapted for calling a phone number and transmitting an activation signal followed by binary codes upon the receipt thereof. Lastly, a computer is connected between the source of weather data, subscriber database, and modem. The computer functions to transmit to the modem an activation signal, a phone number and binary codes upon the detection of a weather disturbance by the source of weather data. Such phone number corresponds to a user residing within a geographical location where a weather disturbance is present as indicated by the source of weather data. The binary codes that are transmitted by way of the modem correspond to warning messages associated with the description of the weather disturbance as indicated by the source of weather data.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new home weather emergency warning system apparatus and method which has many of the advantages of the weather service devices mentioned heretofore and many novel features that result in a new home weather emergency warning system which is not anticipated, rendered obvious, suggested, or even implied by any of the prior art weather service devices, either alone or in any combination thereof.

It is another object of the present invention to provide a new home weather emergency warning system which may be easily and efficiently manufactured and marketed.

It is a further object of the present invention to provide a new home weather emergency warning system which is of a durable and reliable construction.

An even further object of the present invention is to provide a new home weather emergency warning system which is susceptible of a low cost of manufacture with regard to both materials and labor, and which accordingly is then susceptible of low prices of sale to the consuming public, thereby making such home weather emergency warning system economically available to the buying public.

Still yet another object of the present invention is to provide a new home weather emergency warning system which provides in the apparatuses and methods of the prior art some of the advantages thereof, while simultaneously overcoming some of the disadvantages normally associated therewith.

Still another object of the present invention is to provide a new home weather emergency warning system for sending a warning of incoming weather disturbances over a telecommunication network.

Even still another object of the present invention is to provide a new home weather emergency warning system that includes an indicator mechanism adapted for providing an indication of a weather disturbance upon the receipt thereof. A modem has an outlet port connected to a conventional phone and an inlet port connected to a telecommunication network. During use, the modem has a first mode of operation for allowing the transfer of audio signals between the inlet port and the outlet port and a second mode of operation for when a weather disturbance is detected. Next provided is control circuitry adapted for transmitting to the indicator means the indication of a weather disturbance. Finally, a central control base includes a source of weather data for supplying a geographical location of a weather disturbance and a description of the weather disturbance, a subscriber database having stored therein a plurality of phone numbers of users and further the geographical location thereof, a modem adapted for calling a phone number, and a computer adapted to effect the transmission of the indication of a weather disturbance by the indicator means upon the detection of a weather disturbance by the source of weather data. Such phone number corresponds to a user residing within a geographical location wherein a weather disturbance is present as indicated by the source of weather data.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic diagram of a new home weather emergency warning system according to the present invention.

FIG. 2 is a schematic diagram of the control base of the present invention.

DESCRIPTION OF THE PREFERRED EMBODIMENT

Figure 3:
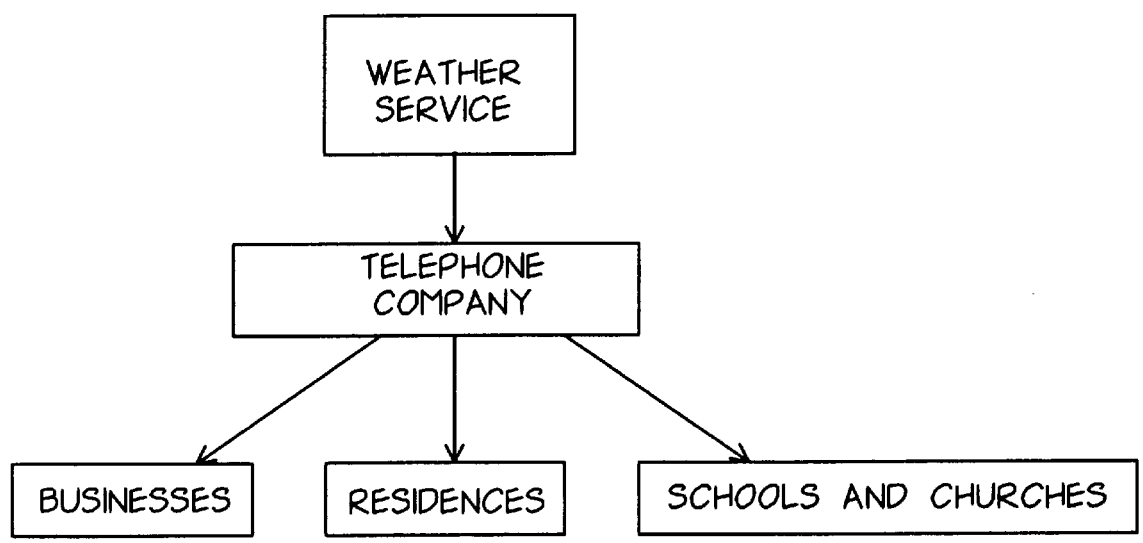
FIG. 3 is an overview of the interconnection of the various components of the present invention.

With reference now to the drawings, and in particular to FIGS. 1 through 5 thereof, a new home weather emergency warning system embodying the principles and concepts of the present invention and generally designated by the reference numeral 10 will be described.

Figure 4:
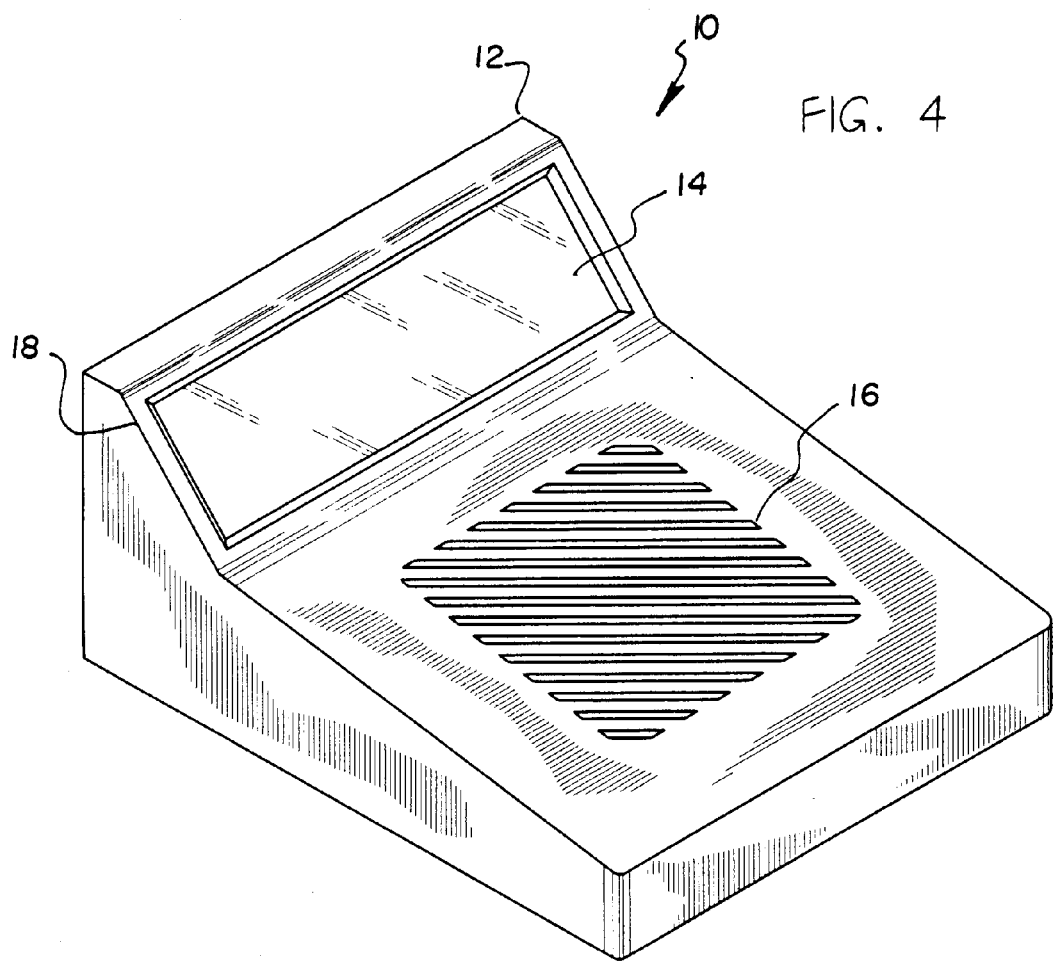
FIG. 4 is a perspective view of the housing of the present invention.

The present invention, as designated as numeral 10, includes a housing 12. Situated on the housing is an LCD display 14, as shown in FIG. 4. The display is adapted for depicting alphanumeric data representative of a visual warning message upon the receipt thereof. Associated therewith is a speaker 16 situated on the housing for sounding audio signals representative of an audio warning message upon the receipt thereof.

Figure 5:
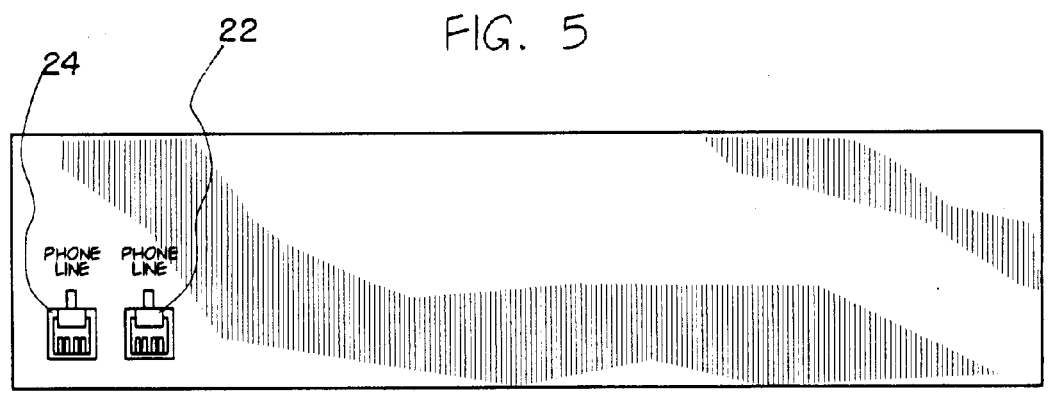
FIG. 5 is a rear view of the housing of the present invention.

As shown in FIGS. 4 & 5, a top face of the housing preferably has a beveled portion 18 with the display mounted thereon. The speaker is situated on the top face adjacent the beveled portion.

A modem 20 is situated within the housing and has an outlet port 22 connected to a conventional phone and an inlet port 24 connected to a telecommunication network. The ports are ideally positioned on a rear face of the housing. During operation, the modem has a first mode of operation for allowing the free transfer of audio signals between the inlet port and the outlet port. Upon the receipt of an activation signal, the modem further has a second mode of operation for receiving data from the inlet port.

Next provided is read only memory 26 situated within the housing. The read only memory serves for storing alphanumeric data representative of visual warning messages and audio signals representative of audio warning messages. Each warning message has a binary code associated therewith. It should be understood that each warning message corresponds to a specific set of instructions and a type of weather disturbance.

The final component situated within the housing is control circuitry 30. Such circuitry is connected to the display, speaker, modem, and read only memory. In use, the control circuitry is adapted for transmitting audio signals and alphanumeric data to the speaker and display, respectively, that are retrieved from the read only memory upon the receipt of a corresponding binary code from the modem. Such signals and data correspond to binary codes received by the modem.

While the term binary codes is employed in the present description, it should be understood that binary codes take the form of analog audible signals over the telecommunication network. Such analog audible signals must be decoded at each housing. Note FIG. 1.

Finally, a central control base 32 is provided including a source of weather data 33 for supplying a geographical location of a weather disturbance and a description of the weather disturbance. Such source of weather data may take the form of either a human operator or an automated system. Further associated therewith is a subscriber database 34 having stored therein a plurality of phone numbers of users and further the geographical location thereof. A modem 35 is adapted for calling a phone number and transmitting an activation signal followed by binary codes upon the receipt thereof. Lastly, a computer 36 is connected between the source of weather data, subscriber database, and modem.

The computer functions to transmit to the modem an activation signal, a phone number and binary codes upon the detection of a weather disturbance by the source of weather data. Such phone number corresponds to a user residing within a geographical location where a weather disturbance is present as indicated by the source of weather data. The binary codes that are transmitted by way of the modem correspond to warning messages associated with the description of the weather disturbance as indicated by the source of weather data. It should be noted that by sending only binary codes and storing the messages in each of the housings, the length of the calls are shortened thereby allowing a vast number of homes to be called quickly with fewer modems.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A severe weather warning system comprising, in combination:

a housing:

a display situated on the housing for depicting alphanumeric data representative of a visual warning message upon the receipt thereof;

a speaker situated on the housing for sounding audio signals representative of an audio warning message upon the receipt thereof;

a modem situated within the housing and having an outlet port connected to a conventional phone and an inlet port connected to a telecommunication network, the modem having a first mode of operation for allowing the transfer of audio signals between the inlet port and the outlet port and a second mode of operation for receiving data from the inlet port upon the receipt of an activation signal;

read only memory situated within the housing for storing alphanumeric data representative of visual warning messages and audio signals representative of audio warning messages, each warning message having a binary code associated therewith, wherein each warning message corresponds to a specific set of instructions and a type of weather disturbance;

control circuitry situated within the housing and connected to the display, speaker, modem, and read only memory, the control circuitry adapted for transmitting audio signals and alphanumeric data to the speaker and display, respectively which correspond to binary codes received by the modem; and a central control base including a source of weather data for supplying a geographical location of a weather disturbance and a description of the weather disturbance, a subscriber database having stored therein a plurality of phone numbers of users and further the geographical location thereof, a modem adapted for calling a phone number and transmitting an activation signal followed by binary codes upon the receipt thereof, and a computer connected between the source of weather data, subscriber database, and modem, the computer adapted to transmit to the modem an activation signal, a phone number and binary codes upon the detection of a weather disturbance by the source of weather data, wherein the phone number corresponds to a user residing within a geographical location wherein a weather disturbance is present as indicated by the source of weather data and further wherein the binary codes corresponds to warning messages associated with the description of the weather disturbance as indicated by the source of weather data.

2. A severe weather warning system comprising:

a housing:

an indicator means on the housing for providing an indication of a weather disturbance upon the receipt thereof;

a modem situated within the housing and having an outlet port connected to a conventional phone and an inlet port connected to a telecommunication network, the modem having a first mode of operation for allowing the transfer of audio signals between the inlet port and the outlet port and a second mode of operation for when a weather disturbance is detected;

control circuitry situated within the housing and connected to the display, speaker, and modem, the control circuitry adapted for effecting the transmission from the indicator means the indication of a weather disturbance when a weather disturbance is detected; and a central control base including a source of weather data for supplying a geographical location of a weather disturbance and a description of the weather disturbance, a subscriber database having stored therein a plurality of phone numbers of users and further the geographical location thereof, a modem adapted for calling a phone number, and a computer connected between the source of weather data, subscriber database, and modem, the computer adapted to effect the transmission of the indication of a weather disturbance by the indicator means upon the detection of a weather disturbance by the source of weather data, wherein the phone number corresponds to a user residing within a geographical location and further wherein a weather disturbance is present as indicated by the source of weather data.

3. A severe weather warning system as set forth in claim 2 wherein the indicator means includes a display situated on the housing for depicting the indication of a weather disturbance which takes the form of alphanumeric data representative of a visual warning message upon the receipt thereof.

4. A severe weather warning system as set forth in claim 2 wherein the indicator means includes a speaker situated on the housing for sounding the indication of a weather disturbance which takes the form of audio signals representative of an audio warning message upon the receipt thereof.

5. A severe weather warning system as set forth in claim 2 and further including read only memory situated within the housing for storing a plurality of indications of various weather disturbances, each indication of a weather disturbance having a binary code associated therewith, wherein the computer is adapted to transmit the binary code from the modem connected thereto such that the control circuitry effects the transmission of the indication of a weather disturbance to the indicator means.

* * * * *